(12) United States Patent
Shroff et al.

(10) Patent No.: US 12,360,999 B2
(45) Date of Patent: Jul. 15, 2025

(54) DATA LINEAGE QUERYING WITH LINEAGE VISUALIZATIONS

(71) Applicant: Cisco Technology, Inc., San Jose, CA (US)

(72) Inventors: Sushama Shroff, Santa Clara, CA (US); Reinaldo de Azevedo Penno Filho, San Ramon, CA (US); Tal Maoz, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 18/085,798

(22) Filed: Dec. 21, 2022

(65) Prior Publication Data
US 2024/0211476 A1    Jun. 27, 2024

(51) Int. Cl.
*G06F 16/00*     (2019.01)
*G06F 16/2453*   (2019.01)
*G06F 16/248*    (2019.01)

(52) U.S. Cl.
CPC ...... *G06F 16/24542* (2019.01); *G06F 16/248* (2019.01)

(58) Field of Classification Search
CPC .......................... G06F 16/24542; G06F 16/248
USPC ......................................................... 707/715
See application file for complete search history.

(56) References Cited

U.S. PATENT DOCUMENTS

| 9,075,860 | B2 | 7/2015 | Kozina et al. |
| 10,431,002 | B2 * | 10/2019 | Gordon ................. G06T 19/003 |
| 11,086,751 | B2 | 8/2021 | Moresmau et al. |
| 2008/0183658 | A1 * | 7/2008 | Mangipudi ........... G06F 16/254 |
| 2008/0183747 | A1 * | 7/2008 | Mangipudi ......... G06F 16/2246 |
| 2022/0066772 | A1 | 3/2022 | Gowda et al. |
| 2022/0134222 | A1 * | 5/2022 | Lebaredian ............. A63F 13/56 463/31 |

FOREIGN PATENT DOCUMENTS

CN       104915390 A      9/2015

OTHER PUBLICATIONS

"What is data lineage and how can graph analytics help track & visualize it?", online: https://linkurious.com/blog/how-to-track-and-visualize-data-lineage/, Apr. 30, 2019, 6 pages, Linkurious SAS.
"Data Lineage", online: https://en.wikipedia.org/wiki/Data_lineage, Sep. 6, 2022, 14 pages, Wikimedia Foundation, Inc.

* cited by examiner

*Primary Examiner* — Monica M Pyo
(74) *Attorney, Agent, or Firm* — BEHMKE INNOVATION GROUP LLC; James M. Behmke (57) ABSTRACT

In one embodiment, a device stores, in a database, relationship metadata indicative of an entry in one data field in the database being derived from that of another data field in the database. The device receives a structured database query that includes an identifier for a particular data field and a lineage keyword that requests a data lineage of the particular data field. The device executes the structured database query on the database to generate a data lineage report for the particular data field by tracing the relationship metadata associated with the particular data field to one or more related data fields. The device provides the data lineage report for display. The data lineage report includes information regarding the one or more related data fields.

17 Claims, 7 Drawing Sheets

DATA LINEAGE QUERYING WITH LINEAGE VISUALIZATIONS

TECHNICAL FIELD

The present disclosure relates generally to computer networks, and, more particularly, to data lineage querying with lineage visualizations.

BACKGROUND

With the increasing collection, sharing, and use of personal data, there has been a corresponding interest in the notion of data lineage reporting. Generally speaking, data lineage reporting entails tracing data from its origin through its various transformations and storage locations, to arrive at its final use(s). Such reporting lists all the upstream and downstream dependencies of the data. For instance, in the case of personal data such as the location of a user, its data lineage may indicate the source of the location data (e.g., the cell phone of the user) and all of the data entities that used it.

From a database standpoint, existing query languages, such as the Structured Query Language (SQL), do not support data lineage queries, directly. This makes data lineage reporting quite challenging, as it requires a priori knowledge as to how the data is being used. In addition, even when a data lineage report is successfully generated, it may be confusing for a user to navigate through the report.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device stores, in a database, relationship metadata indicative of an entry in one data field in the database being derived from that of another data field in the database. The device receives a structured database query that includes an identifier for a particular data field and a lineage keyword that requests a data lineage of the particular data field. The device executes the structured database query on the database to generate a data lineage report for the particular data field by tracing the relationship metadata associated with the particular data field to one or more related data fields. The device provides the data lineage report for display. The data lineage report includes information regarding the one or more related data fields.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
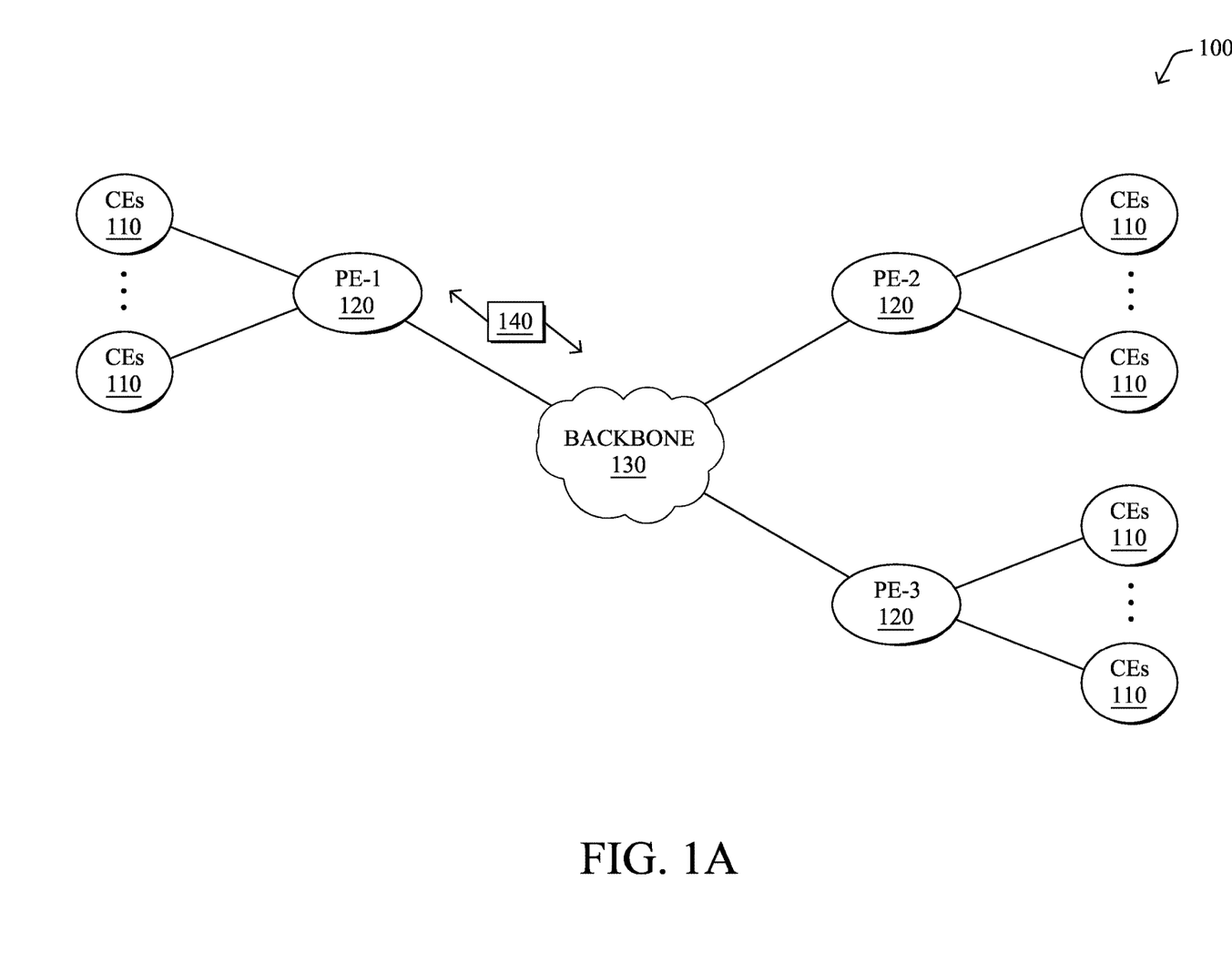
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
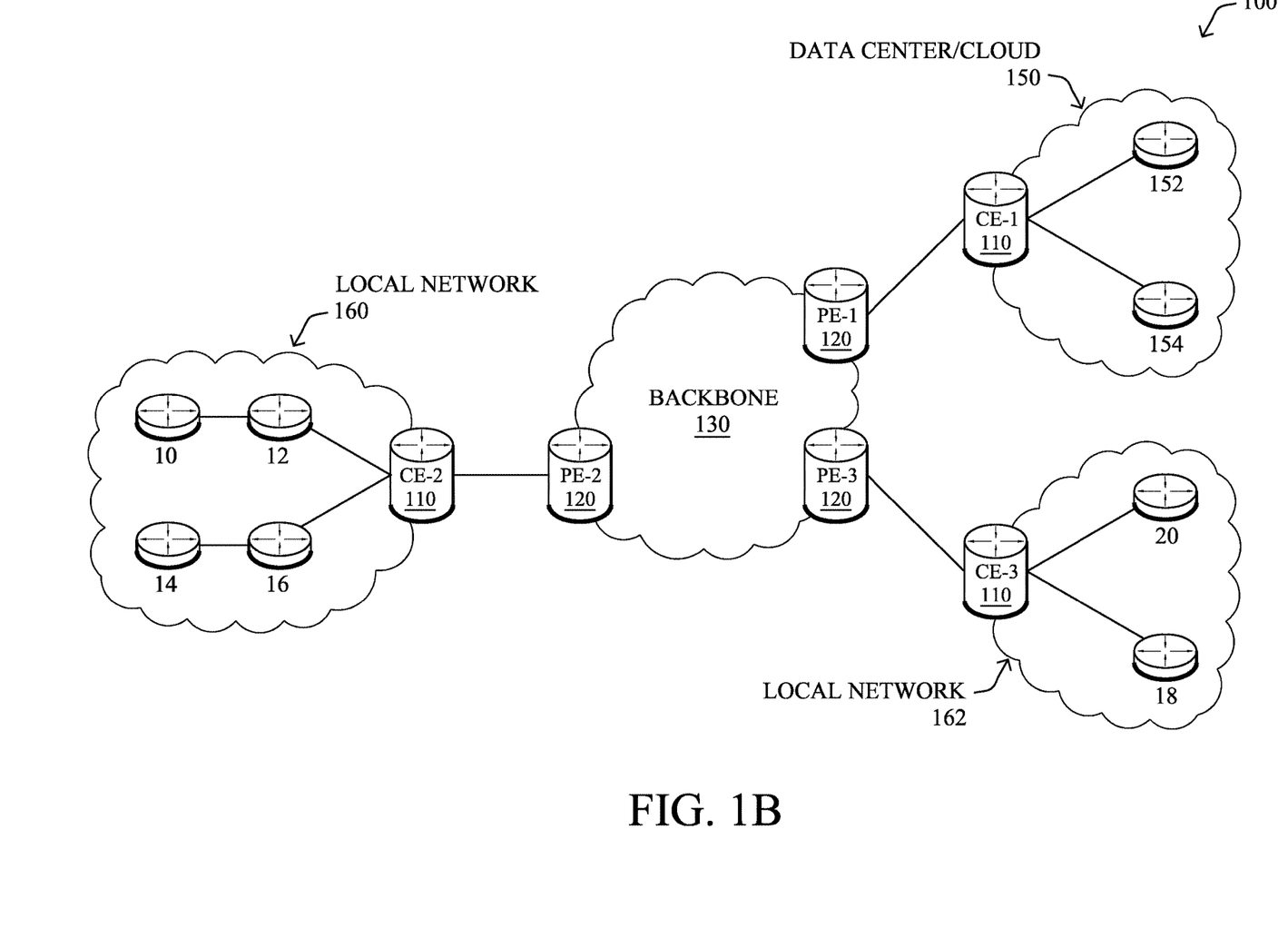

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

Figure 2:
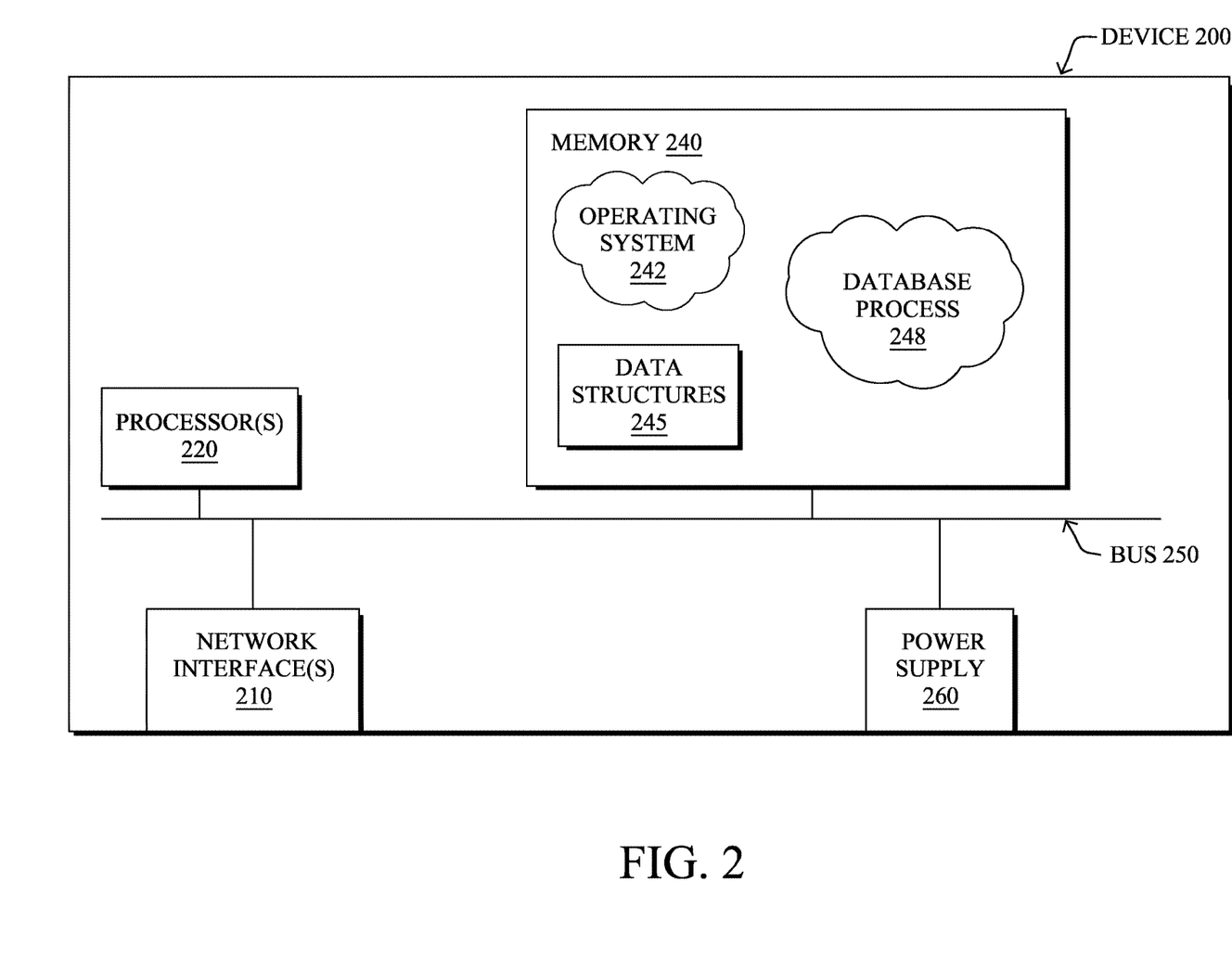
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as Internet of Things (IoT) nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a database process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, more and more data is being collected and used for various purposes. Such data may include, but is not limited to, sensor data, personally identifiable information (PII), web traffic data, and the like. For instance, consider the case of a smart thermostat that reports the temperature settings and temperature measurements for a house of a given user. Such information may then be analyzed (and transformed) any number of times, before being used by a particular data process. For example, say the temperature measurements for the user's house are then aggregated with those of others in the same city, to compute an average temperature measurement as part of a report sent to the local electric company. From the perspective of the user/homeowner, however, they may only have insight into the initial sharing of the data from their thermostat, without any knowledge of how their data is actually being used.

—Data Lineage Querying with Lineage Visualizations—

The techniques herein introduce query and visualization mechanisms to enhance data lineage reporting. In some aspects. Structured Query Language (SQL) extensions are introduced herein that can be used to simplify the querying of data lineages from a database. Further aspects of the techniques herein relate to visualizing the results of such a query in 3D, such as through the use of virtual reality (VR) or augmented reality (AR).

Illustratively, the techniques described herein may be performed by hardware, software, and/or firmware, such as database process 248, which may include computer executable instructions executed by the processor 220 (or independent processor of interfaces 210) to perform functions relating to the techniques described herein.

Specifically, according to various embodiments, a device stores, in a database, relationship metadata indicative of an entry in one data field in the database being derived from that of another data field in the database. The device receives a structured database query that includes an identifier for a particular data field and a lineage keyword that requests a data lineage of the particular data field. The device executes the structured database query on the database to generate a data lineage report for the particular data field by tracing the relationship metadata associated with the particular data field to one or more related data fields. The device provides the data lineage report for display. The data lineage report includes information regarding the one or more related data fields.

Operationally, the data lineage reporting techniques introduced herein involve the following concepts:

Data Fields—Each data field stores a particular type of data. For instance, in the case of a smart thermostat, the temperature setpoint and measured temperature values may be stored in the database as separate data fields.

Datasets—A dataset represents a logical grouping of one or more data fields. For instance, one dataset may represent the set of data collected from a smart thermostat, such as its temperature setpoint, temperature measurements, etc.

Data Process—A piece of software that takes as input one or more datasets and performs analysis and/or transformations on their constituent data fields. In many cases, a data process may also generate an output dataset, based on its input dataset(s). For instance, a data process may take as input the dataset collected from a smart thermostat, as well as another dataset regarding power distributions by a public utility, to generate a dataset that denotes the average power consumption in a city as a function of the temperature setpoints used in homes throughout the city.

According to various embodiments, the techniques herein propose storing relationship metadata in a database that relate the data fields, datasets, and data processes whose information is stored in a database. In some embodiments, the relationship metadata may indicate any or all of the following relationships:

That one data field is derived from another data field. For instance, a first data field storing an average thermostat temperature setpoint for a city may be derived from another data field in which the individual thermostat temperature setpoints are stored.

That a dataset is consumed by a data process. For instance, a data process of a public utility may consume the dataset that includes the reported data from the smart thermostats in a given area for purposes of analysis and reporting.

That a data process produces a dataset. Here, the data process may also generate a new dataset based on the dataset(s) that it consumes/takes as input. For instance, in the case of the public utility, the new dataset may include city-wide metrics, such as average temperature setpoints, average temperature measurements, timestamp information, etc.

Figure 3:
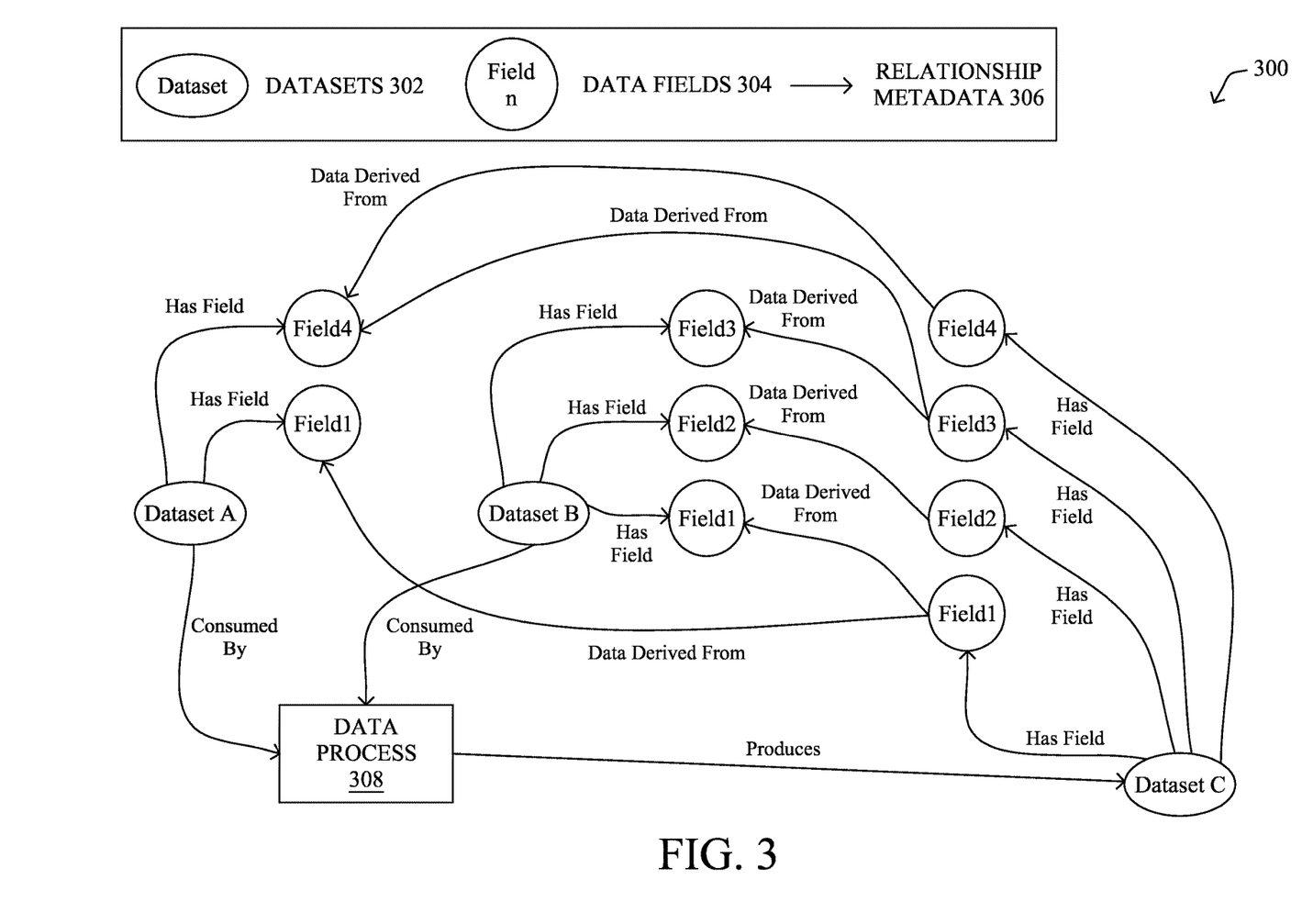
FIG. 3 illustrates an example diagram showing a database storing relationship metadata.

FIG. 3 illustrates an example diagram 300 showing a database storing relationship metadata, in various embodiments. To illustrate the above techniques, assume that the database stores a plurality of datasets 302, each having its own constituent data fields 304. As would be appreciated, this information may be stored across any number of tables and across any number of servers or other devices, depending on the deployment. In addition, further assume that there is a data process 308 that performs operations on some of the datasets 302, such as "Dataset A" and "Dataset B" shown.

According to various embodiments, relationship metadata 306 may also be stored in the database, to indicate the relationships between datasets 302, data fields 304, and/or data process 308. Such metadata may be generated automatically by the database process (e.g., database process 248) during storage or modification of the data in the database, in some embodiments. In other embodiments, relationship metadata 306 may be curated, at least in part, by one or more experts. In further embodiments, relationship metadata 306 may be generated by data process 308 and stored in the database by the database process.

As shown, for instance, assume that there are two initial datasets 302 in the database: "Dataset A" and "Dataset B." Dataset A has two data fields 304: Field 1 and Field 4. Likewise, Dataset B has its own three data fields: Field 1, Field 2, and Field 3. Both of Datasets A-B may then be used as input to data process 308, thereby creating a new dataset 302: Dataset C, which has its own data fields 304: Fields 1-4. Here, Field 1 of Dataset C may be derived from Field 1 of Dataset A and Field 1 of Database B. Similarly, Field 2 of Dataset C may be derived from Field 2 of Database B. Field 3 of Dataset C may be derived from both Field 3 of Dataset B, as well as from Field 4 of Dataset A. Finally, Field 4 of Dataset C may be derived from Field 4 of Dataset A.

By storing the relationship metadata 306 that links the various datasets, data fields, and data processes, this allows for database process 248 to generate data lineage reports regarding how a particular data field is used. For instance, a data lineage report may answer the question: "How is Field 1 in Dataset A used?" To provide an answer, database process 248 may trace the relationship metadata 306 linking this field to Field 1 of Dataset C, which was generated by data process 308. In the case of the temperature setpoints from a user's smart thermostat, for instance, such a data lineage report could indicate to the user that their data (Field 1 of Dataset A) is being used by a data process of their local utility (i.e., data process 308) to compute an aggregate value (Field 1 of Dataset C).

According to various embodiments, database process 248 may generate a data lineage report by executing a received structured database query. As would be appreciated, traditional query languages, such as SQL, do not support data lineage queries, directly. In various embodiments, the techniques herein propose a number of extensions to a database query language that allow for the explicit querying of data lineage information. Thus, certain aspects of the techniques herein could be implemented as a modification of SQL or another database query language, or as its own standalone database query language.

In various embodiments, a structured database query executed by database process 248 may include any of the following keywords or syntax:

- A "child" keyword that seeks the data field(s) directly derived from an input data field.
- A "parent" keyword that seeks the data field(s) from which an input data field is directly derived.
- A "child lineage" keyword that seeks the dataset(s) and data process(es) that use data fields derived from the input data field.
- A "parent lineage" keyword that seeks the dataset(s) and data process from which the input data field is derived.
- A "producer lineage" keyword that seeks the data field(s) from which the input data field is derived.
- A "consumer lineage" keyword that seeks the data field(s) that are derived from the input data field.
- A "level" keyword that limits the results to a specified number of degrees of derivation.
- "Function" syntax that specifies some user defined function (UDF).

By way of example and with reference to FIG. 3, one such structured database query may be of the form, which uses SQL syntax:
SELECT ParentLineage WITH LEVEL=2, ProducerLineage FROM DatasetC.Field3 WITH FUNC=UseData Version(1.0)

Here, DatasetC.Field3 indicates the particular data field 304 for which the query is to be referenced. The ParentLineage keyword combined with the "WITH LEVEL=2" syntax thus seeks the dataset(s) and data processes that are the parents of DatasetC.Field3, up to two levels of separation apart from it. Execution of this portion of the query will yield two levels: DatasetC and DataProcess. The UseData Version(1.0) syntax is the specified function, as implemented by the user. The ProducerLineage keyword will likewise yield two results: DatasetB.Field3, DatasetA.Field4, which are the two data fields 304 from which DatasetC.Field3 was derived.

As a result of the execution of the query, database process 248 may then provide the data lineage report for display. In some embodiments, it may do so by representing the data lineage report as a set of interlinked two dimensional (2D) or three dimensional (3D) objects that represent the dataset (s), data field(s), and/or data process(es) related to the query (e.g., the specified data field and those data fields, datasets, and/or data processes that are related to it according to the lineage keywords used in the query).

Figure 4:
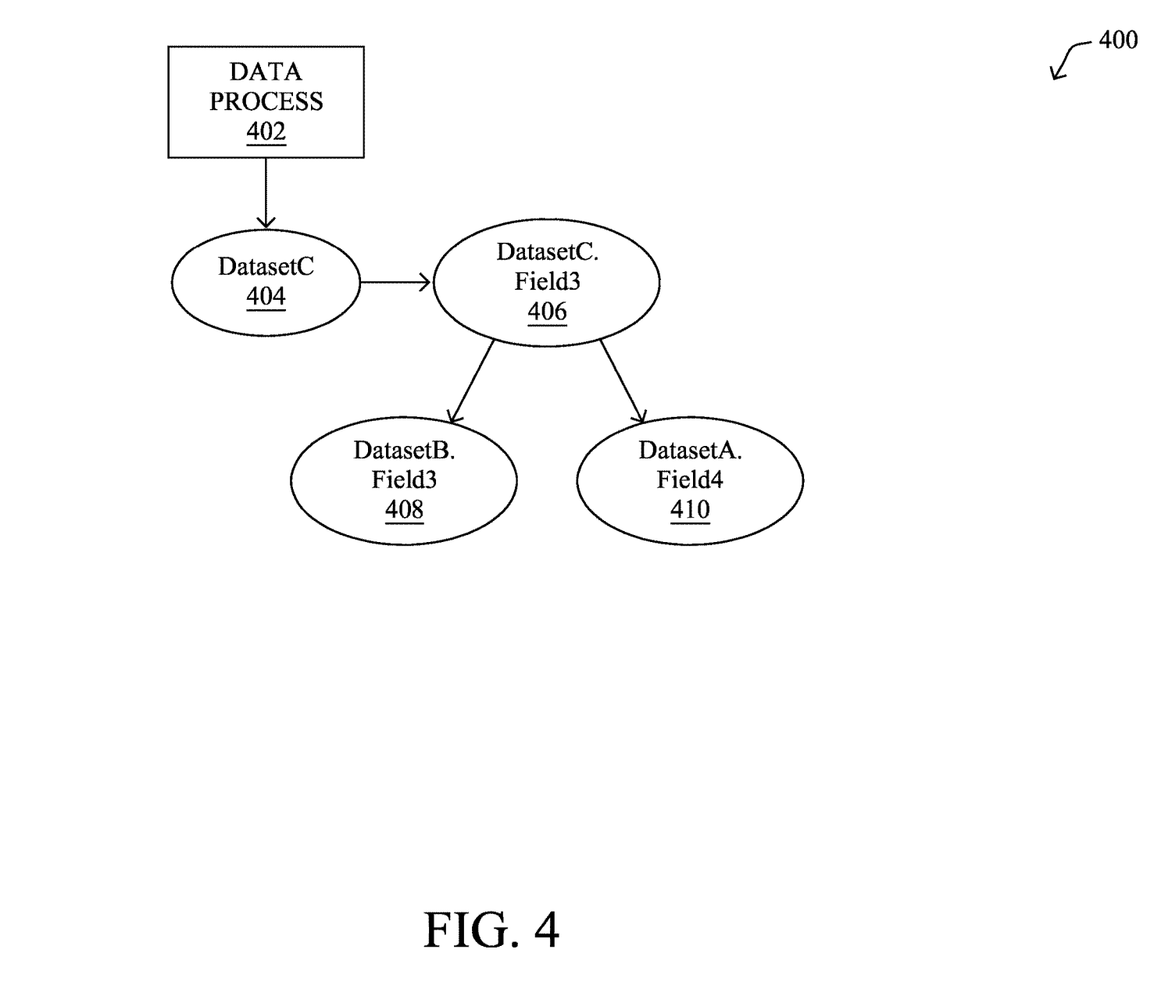
FIG. 4 illustrates an example of a data lineage report.

By way of example, FIG. 4 illustrates an example of a data lineage report 400, in some embodiments. Continuing the example of the above query with respect to FIG. 3, data lineage report 400 may visually represent DataProcess (i.e., data process 308) as a 2D or 3D visual object 402 that is connected to another visual object 404, which represents DatasetC. Likewise, visual object 404 may be linked to a visual object 406, which represents DatasetC.Field3, which is also linked to visual objects 408-410, which represent DatasetB.Field3 and DatasetA.Field4, respectively.

In some instances, these linkages may take the form of directional indicators, such as arrows or the like, to visually represent the types of relationships between the represented objects. For instance, a directional arrow linking visual object 406 to visual object 408 may denote that DatasetC.Field3 is derived from DatasetB.Field3. Other visual indicia may also be used, as desired, such as text, colorations, dashed lines, or the like, to denote the types of relationships in data lineage report 400.

In a further embodiment, data lineage report 400 may be displayed in the three dimensional space, such as via a virtual reality (VR) or augmented reality (AR) headset of the user that provides the query. Indeed, humans are born into a 3D world and naturally perceive a 3D space. Thus, it only makes sense to bring the lineage information into the 3D space for ease of understanding. In some embodiments, rather than requiring the user to enter the structured database query directly, such a query could be formulated by database process 248 through the use of natural language processing (NLP), voice recognition, or similar techniques. For instance, in the case of the data lineage report being presented on a VR or AR display, a user may simply say or type "show me the producer lineage for data field X," which database process 248 may translate into a structured database query, accordingly.

In various embodiments, the extra dimension (i.e., in 3D) can either be used dynamically, the same way that 2D graph layout engines are used to visualize a graph, or by letting the user choose its usage. One example could be by clustering the results by certain parameters, such as the owner of the data, the geographic locations from which the data was sourced or stored, the importance or usage frequency of the data, or other such factors.

In further embodiments, the techniques herein could also be used to support AR functions that would allow a user not only to visualize the data lineage, but also see where in a data center that data is stored, physically. This could allow users to easily track the data as it travels across the network and help optimize network layouts and query performance.

Figure 5:
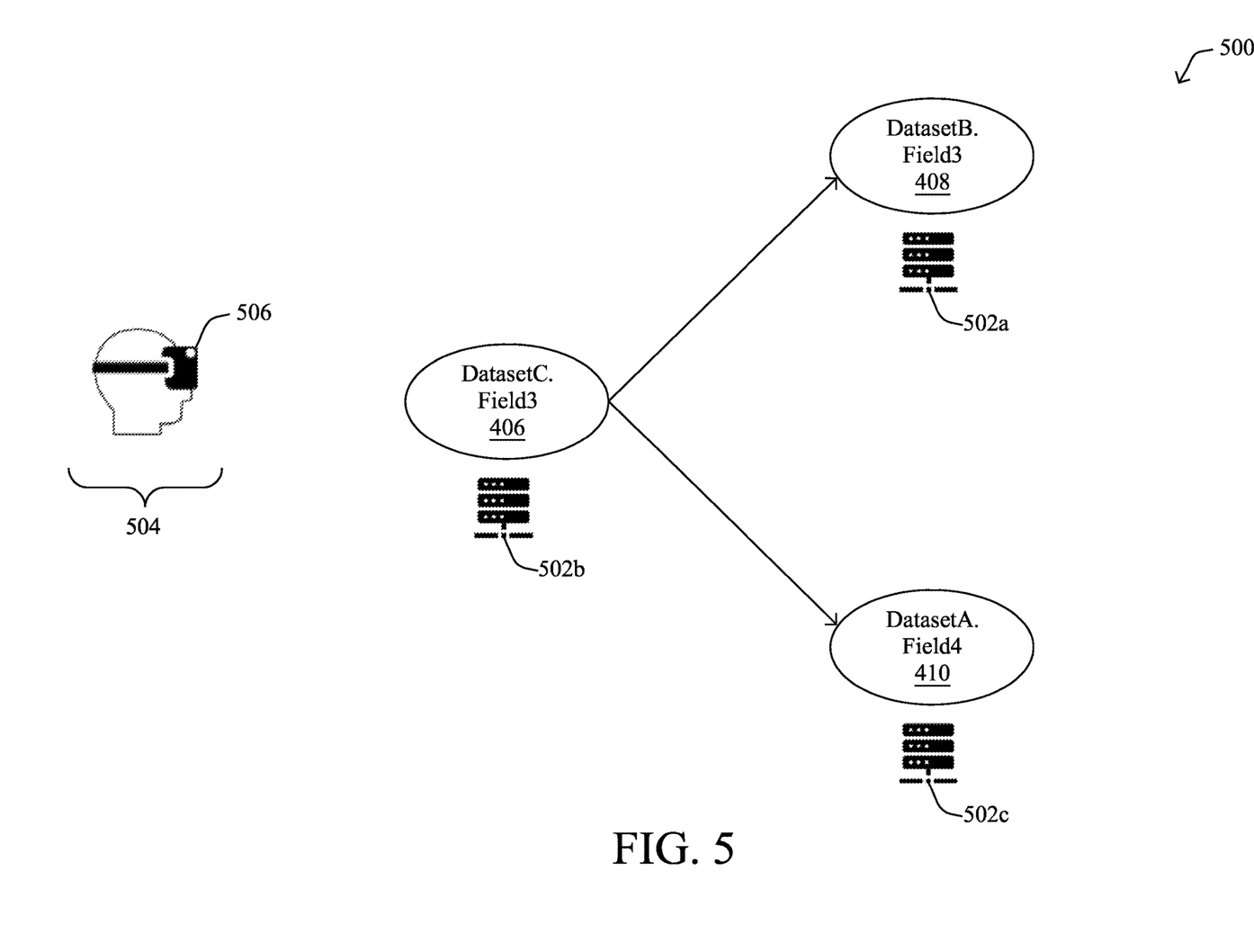
FIG. 5 illustrates an example of presenting a data lineage report as an augmented reality overlay.

By way of example, FIG. 5 illustrates an example 500 of presenting a data lineage report as an AR overlay, in some embodiments. Assume that the database whose data includes that depicted in FIG. 3 is stored across a number of different servers, such as servers 502*a*-502*c*. Here, assume that the three data fields from data lineage report 400 that results from executing the above query are stored across these three servers 502*a*-502*c*. In such a case, the data lineage report may be provided to an AR display 506 operated by a user 504 present in the datacenter where servers 502*a*-502*c*.

In addition to displaying the data fields (or datasets, data processes, etc.) of the data lineage report as 2D or 3D visual objects, the data lineage report may also anchor these visual objects to the physical devices in which they are stored. For instance, AR display 506 may depict visual object 406 as an AR overlay that is anchored to server 502*b* at which DatasetC.Field3 is stored, visual object 408 as an AR overlay that is anchored to server 502*a* at which DatasetB.Field3 is stored, and visual object 410 as an AR overlay that is anchored to server 502*c* at which DatasetA.Field4 is stored.

By presenting the data lineage report as an AR overlay, this allows user 504 to navigate through the datacenter and visualize the flow of the data as it is transformed and used. Such information can be particularly useful in the case of optimizing the networking between servers 502a-502c, forming maintenance schedules, or the like.

Figure 6:
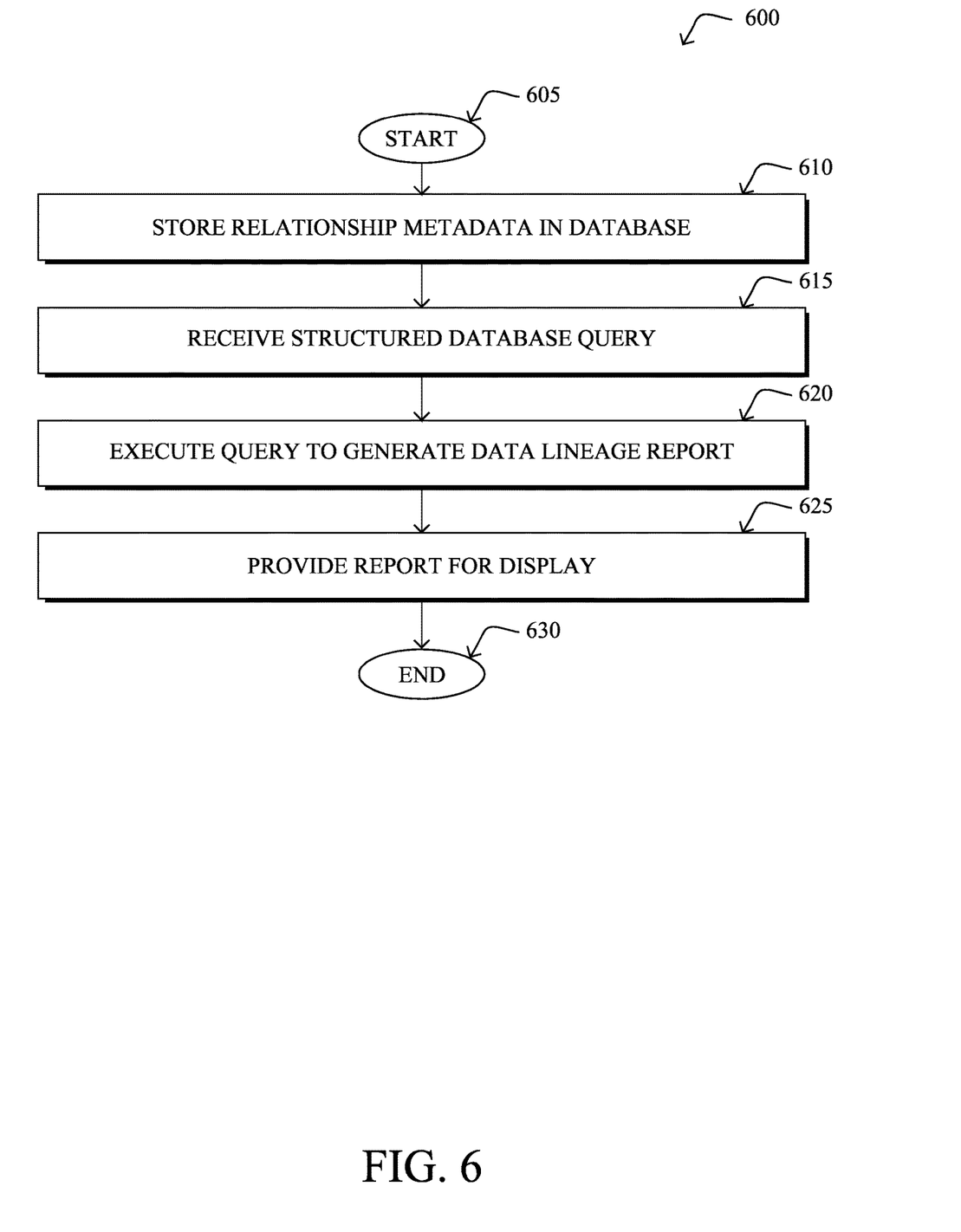
FIG. 6 illustrates an example simplified procedure for data lineage querying with lineage visualizations.

FIG. 6 illustrates an example simplified procedure (e.g., a method) for data lineage querying with lineage visualizations, in accordance with one or more embodiments described herein. In various embodiments, procedure 600 may be performed by a device in a network (e.g., a device 200 executing database process 248). As shown, procedure 600 may start at step 605 and continue on to step 610 where, as described in greater detail above, the device may store, in a database, relationship metadata indicative of an entry in one data field in the database being derived from that of another data field in the database.

At step 615, as detailed above, the device may receive a structured database query that includes an identifier for a particular data field and a lineage keyword that requests a data lineage of the particular data field. In one embodiment, the structured database query includes an indicator for a first dataset of which the particular data field is a member. In a further embodiment, the data lineage report identifies a second dataset of which at least one of the one or more related data fields is a member. In some embodiments, the lineage keyword indicates whether the structured database query is to seek data fields from which the particular data field is derived or data fields that are derived from the particular data field. In further embodiments, the structured database query comprises Structured Query Language (SQL) syntax.

At step 620, the device may execute the structured database query on the database to generate a data lineage report for the particular data field by tracing the relationship metadata associated with the particular data field to one or more related data fields, as described in greater detail above. In some embodiments, the structured database query includes a level keyword that limits the data lineage report to a maximum number of data fields related to the particular data field.

At step 625, as detailed above, the device may provide the data lineage report for display. In various embodiments, the data lineage report includes information regarding the one or more related data fields. In some embodiments, the device may provide the report for display by representing the particular data field and the one or more related data fields as three dimensional objects interconnected by their associated relationship metadata. In one embodiment, the data lineage report is provided to a virtual reality endpoint for display. In another embodiment, the data lineage report is provided to an augmented reality endpoint for display and indicates one or more physical servers at which the one or more related data fields are stored. In one embodiment, the data lineage report indicates a data process that generated the particular data field or at least one of the one or more related data fields.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for data lineage querying with lineage visualizations, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    storing, by a device and in a database, relationship metadata indicative of an entry in one data field in the database being derived from that of another data field in the database;
    receiving, at the device, a structured database query that includes an identifier for a particular data field and a lineage keyword that requests a data lineage of the particular data field, wherein the lineage keyword indicates whether the structured database query is to a) seek data fields from which the particular data field is derived or data fields that are derived from the particular data field and b) seek data processes from which the particular data field is derived or data processes that are derived from the particular data field;
    executing by the device, the structured database query on the database to generate a data lineage report for the particular data field by tracing the relationship metadata associated with the particular data field to one or more related data fields; and
    providing, by the device, the data lineage report to an augmented reality endpoint or a virtual reality endpoint for display by representing the particular data field and the one or more related data fields as three dimensional objects interconnected by their associated relationship metadata, wherein the data lineage report includes indications for: a) one or more physical servers at which the one or more related data fields are stored and b) a data process.

2. The method as in claim 1, wherein the structured database query includes an indicator for a first dataset of which the particular data field is a member.

3. The method as in claim 2, wherein the data lineage report identifies a second dataset of which at least one of the one or more related data fields is a member.

4. The method as in claim 1, wherein the structured database query includes a level keyword that limits the data lineage report to a maximum number of data fields related to the particular data field.

5. The method as in claim 1, wherein the structured database query comprises Structured Query Language (SQL) syntax.

6. The method as in claim 1, wherein the data process generated the particular data field or at least one of the one or more related data fields.

7. An apparatus, comprising:
    one or more network interfaces;
    a processor coupled to the one or more network interfaces and configured to execute one or more processes; and a memory configured to store a process that is executable by the processor, the process when executed configured to:

store, in a database, relationship metadata indicative of an entry in one data field in the database being derived from that of another data field in the database;

receive a structured database query that includes an identifier for a particular data field and a lineage keyword that requests a data lineage of the particular data field, wherein the lineage keyword indicates whether the structured database query is to a) seek data fields from which the particular data field is derived or data fields that are derived from the particular data field and b) seek data processes from which the particular data field is derived or data processes that are derived from the particular data field;

execute the structured database query on the database to generate a data lineage report for the particular data field by tracing the relationship metadata associated with the particular data field to one or more related data fields; and provide the data lineage report to an augmented reality endpoint or a virtual reality endpoint for display by representing the particular data field and the one or more related data fields as three dimensional objects interconnected by their associated relationship metadata, wherein the data lineage report includes indications for: a) one or more physical servers at which the one or more related data fields are stored and b) a data process.

8. The apparatus as in claim 7, wherein the structured database query includes an indicator for a first dataset of which the particular data field is a member.

9. The apparatus as in claim 8, wherein the data lineage report identifies a second dataset of which at least one of the one or more related data fields is a member.

10. The apparatus as in claim 7, wherein the structured database query includes a level keyword that limits the data lineage report to a maximum number of data fields related to the particular data field.

11. The apparatus as in claim 7, wherein the structured database query comprises Structured Query Language (SQL) syntax.

12. A tangible, non-transitory, computer-readable medium storing program instructions that cause a device to execute a process comprising:

storing, by the device and in a database, relationship metadata indicative of an entry in one data field in the database being derived from that of another data field in the database;

receiving, at the device, a structured database query that includes an identifier for a particular data field and a lineage keyword that requests a data lineage of the particular data field, wherein the lineage keyword indicates whether the structured database query is to a) seek data fields from which the particular data field is derived or data fields that are derived from the particular data field and b) seek data processes from which the particular data field is derived or data processes that are derived from the particular data field;

executing by the device, the structured database query on the database to generate a data lineage report for the particular data field by tracing the relationship metadata associated with the particular data field to one or more related data fields; and providing, by the device, the data lineage report to an augmented reality endpoint or a virtual reality endpoint for display by representing the particular data field and the one or more related data fields as three dimensional objects interconnected by their associated relationship metadata, wherein the data lineage report includes indications for: a) one or more physical servers at which the one or more related data fields are stored and b) a data process.

13. The tangible, non-transitory, computer-readable medium storing program instructions as in claim 12, wherein the structured database query includes an indicator for a first dataset of which the particular data field is a member.

14. The tangible, non-transitory, computer-readable medium storing program instructions as in claim 13, wherein the data lineage report identifies a second dataset of which at least one of the one or more related data fields is a member.

15. The tangible, non-transitory, computer-readable medium storing program instructions as in claim 12, wherein the structured database query includes a level keyword that limits the data lineage report to a maximum number of data fields related to the particular data field.

16. The tangible, non-transitory, computer-readable medium storing program instructions as in claim 12, wherein the structured database query comprises Structured Query Language (SQL) syntax.

17. The tangible, non-transitory, computer-readable medium storing program instructions as in claim 12, wherein the data process generated the particular data field or at least one of the one or more related data fields.

\* \* \* \* \*